US006796751B2

(12) United States Patent
Flolo

(10) Patent No.: US 6,796,751 B2
(45) Date of Patent: Sep. 28, 2004

(54) SERRATED BALL NOSE END MILL INSERT

(75) Inventor: Dennis P. Flolo, Friendswood, TX (US)

(73) Assignee: Tool Flo Manufacturing, Inc., Houston, TX (US)

( * ) Notice: Subject to any disclaimer, the term of this patent is extended or adjusted under 35 U.S.C. 154(b) by 0 days.

(21) Appl. No.: 10/669,274

(22) Filed: Sep. 24, 2003

(65) Prior Publication Data

US 2004/0057802 A1 Mar. 25, 2004

Related U.S. Application Data

(63) Continuation of application No. 09/920,758, filed on Aug. 2, 2001, now abandoned.

(51) Int. Cl.[7] .................................................. B26D 1/12
(52) U.S. Cl. .............................. 407/42; 407/54; 407/47
(58) Field of Search .............................. 407/42, 54, 47, 407/48, 53

(56) References Cited

U.S. PATENT DOCUMENTS

| 4,560,308 A | * | 12/1985 | Deller ........................ 407/53 |
| 4,764,059 A | * | 8/1988 | Wale ........................... 407/42 |
| 4,936,719 A | * | 6/1990 | Peters ......................... 407/42 |
| 5,160,232 A | * | 11/1992 | Maier ......................... 408/223 |
| 5,213,452 A | * | 5/1993 | Kirby ......................... 407/42 |
| 5,221,164 A | * | 6/1993 | Allaire ....................... 407/113 |
| 5,562,370 A | * | 10/1996 | Vogel et al. ................. 407/42 |
| 5,772,365 A | * | 6/1998 | Vogel et al. ................. 407/42 |
| 5,863,157 A | * | 1/1999 | Harano et al. ............... 407/42 |
| 5,967,710 A | * | 10/1999 | Krenzer ...................... 408/224 |
| 6,102,630 A | * | 8/2000 | Flolo .......................... 407/42 |
| 6,231,275 B1 | * | 5/2001 | Kunimori et al. ............ 407/42 |
| 2002/0090273 A1 | * | 7/2002 | Serwa ......................... 409/132 |

* cited by examiner

Primary Examiner—A. L. Wellington
Assistant Examiner—Brian D. Walsh
(74) Attorney, Agent, or Firm—Loren G. Helmreich; Browning Bushman P.C.

(57) ABSTRACT

The ball nose end mill cutter according to the present invention includes a cutting face 12 providing a plurality of alternating crest 52 and root 54 profiles arranged with respect to each other to further provide a serrated cutting edge 16 on the cutter. The serrations and serrated cutting edge positioned on a cutter insert 10 for removable affixation to a tool body 20 having a centerline of rotation 28, and including an insert body 18 having a contact surface 30 for mating engagement with a mounting surface of the tool body. The ball nose end mill insert further including a curved cutting face surface 12, and a plurality of face serrations formed along the curved cutting face surface, the face serrations having face crests 116 and face roots 216 forming a serrated curved cutting edge 16.

22 Claims, 2 Drawing Sheets

SERRATED BALL NOSE END MILL INSERT

This application is a continuation of Ser. No. 09/920,758 filed Aug. 2, 2001 now abandoned.

FIELD OF THE INVENTION

The present invention relates to machining and milling tools used to shape or dress material surfaces. More particularly, this invention relates to improved, replaceable cutter inserts supported in a ball nose end mill tool body for rotational cutting engagement with a work-piece material.

BACKGROUND OF THE INVENTION

Milling cutters are commonly used in the machining industries for cutting or removing an undesirable portion of material from a work-piece to fabricate or form a desired shape in the remaining work-piece material. Milling cutters are typically either a one-piece with the tool body or use replaceable inserts mounted to the tool body. When worn or dull, one-piece cutters are either sharpened or discarded, and may be more economical for small size milling cutters than insert type cutters. Insert type cutters are commonly used in operations involving long production runs or in association with larger cutting tools, conserving the tool body for re-use. These cutter inserts take on a variety of shapes and forms as required to produce a desired cut in a work-piece. Depending upon their fabrication and use, the inserts may be disposable or may be resharpened for reuse. Inserts may be manufactured from hardened alloys, such as tungsten carbide, cast alloy, or high-speed steel. In some embodiments, the inserts may include carbide or cast alloy tips.

A ball nose end mill is a particular type of milling cutter having a radially curved cutting edge defined by a curved cutting face intersecting a curved land surface. From an axially leading tip of the insert, the cutting surface may curve into tangential engagement with one or more axially trailing straight cutting surfaces spaced apart from and axially parallel with a tool body rotational center axis. Ball nose end mills may initially create an axially directed force on the work piece, creating an axial bore in the work piece. As the bore is deepened, curved cutting areas are exposed to the deepening borehole. Ball nose end mills may be used for shaping or forming a cavity or making other cuts involving removing material in depth or bore penetration movement and/or lateral movement of the rotating ball nose end mill relative to the work-piece.

Cutter inserts may be removably affixed within a cutting end of a ball nose end mill tool body by a conventional securing member, such as a bolt. Cutter inserts for ball nose end mills may be flat-faced inserts positioned on opposite sides of the rotational center axis. Other single body inserts have a tip or leading cutting surface positioned substantially on the rotational center axis and have curved cutting surfaces extending from the tip cutting surface to respective sides of the tool body. Both the multiple insert embodiment and the single insert embodiment preferably provide two curved cutting edges. Each cutting edge may lie substantially within a plane, creating what is commonly known within the industry as a "straight flute" cutting surface, as opposed to other shapes, such as "helical flutes." Helical shaped blanks are impractical for insert type ball nose end mills because the relatively small size of the ball nose tool body does not provide sufficient material to adequately support a helical cutter insert. In larger sizes, the insert itself is both difficult to form and to support in the tool body. A ball nose end mill with a pair of replaceable cuter inserts is disclosed in U.S. Pat. No. 6,102,630.

Inserts for ball nose end mills with flat cutting face surfaces provide a poor cutting action because the cutting edge and flat face of the insert engage the work piece in a blunt fashion, as opposed to along a cutting edge. Thereby, there is substantially no axial or radial rake (shear angle) between the insert cutting edge and the work piece. The mill may tend to "chatter" or vibrate as it rotates in engagement with the work piece, which can be severe. Chatter may lead to increased milling time, shortened tool life, and milling equipment failure. Such vibration may also cause rough, uneven cuts in the work piece. A rotating ball nose end mill may be directed to move axially along the rotational center axis so that the front tip of the insert located on the rotational center axis engages the work piece. As the mill continues to move axially, the insert may bore into the work piece. As the mill continues to bore into the work piece, loading on the insert may spread radially outward along the cutting edge until the insert is engaged with the work piece across the full diameter of rotation. If the mill is moved laterally through the work piece, the mill may experience side loading upon the insert. Combinations or axial and lateral movement create a variety of load conditions upon the insert. For a rotating flat cutting face insert, any such movement undesirably results in blunt engagement with the work piece, without the benefit of radial or axial shear angles.

The disadvantages of the prior art are overcome by the present invention, and an improved cutter insert for a ball nose end mill is hereinafter disclosed.

SUMMARY OF THE INVENTION

The cutter insert of the present invention improves ball nose end mill cutting efficiency by providing a wavy or serrated cutting edge on the insert. The serrated edge may provide axial and radial rake to the cutting edge on an insert cutter. In one embodiment, the serrated surface is shaped in a sinudoidal or wavy pattern, having a repeating plurality of crests and roots along the cutter face. The tool body holding the cutter insert rotates the cutting face about a rotational center axis. Each segment or portion of the cutting face radially outward from the center axis of rotation rotates along a circular path. With the exception of the serration crests and roots, the sinusoidal pattern of the cutting edge positions each finite segment of the cutting edge at an angle with respect to the direction of rotational movement of the respective edge segment. Thereby, a plurality of shear angles may be provided over a substantial portion of the cutting edge (during rotational movement of the cutting face) as opposed to blunt engagement which may occur substantially at only points coinciding with the crest axis of the serration peak and the root axis of the serration root. The plurality of shear angles and/or rakes translates into improved cutting or shear along the cutting edge.

An additional cutting advantage may be obtained by a relief angle formed along the cutting edge, wherein the plane of the relief angle intersects the plurality of crest peaks and roots along the cutting face. Thereby, as a result of the relief angle and the serrated face pattern, each of the sinusoidal peaks may be a radial and/or axial leading cutter edge, while the sinusoidal roots may be a trailing cutter edge. The plurality of cutting edges between the each crest and adjacent root may form a corresponding plurality of axial rake angles with respect to the rotational direction of insert movement. Along the length of the cutting edge, the position and orientation of the cutting forces along the crests and roots, changes radially with respect to the distance to the centerline of rotation, as well as axially with respect to the centerline of rotation, and in angular orientation. The plurality of angles and radial positions along the length of the cutting edge translates into improved shear of the work piece along the cutting edge.

It is an object of the present invention to provide an improved ball nose end mill cutter creating a plurality of radial and/or axial rake angles in a straight flute cutter. A plurality of angles are provided along a cutter face by shaping the cutter face to include a plurality of serrations or wavy profiles having repeating crests and roots along the cutter face and cutter edge.

It is an additional object of the present invention to provide a removable cutter insert including the serrated cutting edge for a ball nose end mill. Although the serrated cutting edge may be formed in the cutting end of a single body milling tool, a preferred embodiment provides replaceable inserts providing the serrated cutting edge.

It is a feature of the present invention that the improved cutter inserts may be formed for removable affixation within existing ball nose end mill tool bodies.

It is yet another feature of this invention that the improved cutter insert may be provided with a grooved contact surface for interlocking engagement with a tool body possessing mating engagement grooves therein, to rigidly secure the insert within the tool body.

Still another feature of the present invention is that the improved cutter may be provided as a single insert including opposing cutting edges, frequently desired for a rotational ball nose end mill use. Thereby, cutting edges may be provided on each side of a common cutter insert.

It is an additional feature that the improved cutter may be provided as two or more separate cutter inserts for simultaneous engagement with a tool body.

It is an advantage of the present invention that the cutter inserts may be provided with a variety of selected serration patterns and dimensions, including particular relief angles, crest to root heights.

A further advantage of this invention is that the cutters may be manufactured from carbide, cast alloy, diamond impregnated, or high speed steel materials.

These and other objects, features, and advantages of the present invention will become apparent and will become more fully described and appreciated from the following claims and detailed description, wherein reference is made to the figures in the accompanying drawings.

BRIEF DESCRIPTION OF PREFERRED EMBODIMENTS

Figure 1:
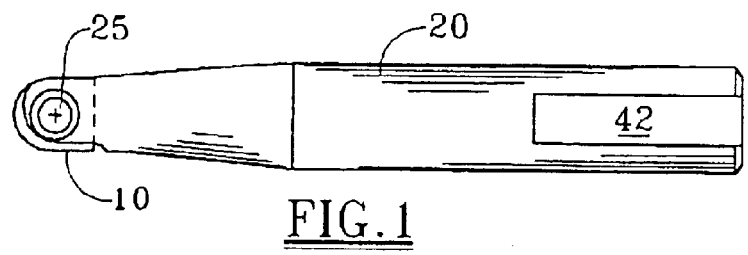
FIG. 1 is a top view of a ball nose end mill tool body securing a removable U-shaped cutter insert within a cutter end of the tool body.

The ball nose end mill cutter 10 according to the present invention includes a cutting face 12 providing a plurality of alternating crest 52 and root 54 profiles arranged with respect to each other to further provide a serrated cutting edge 16 on the cutter. The invention may be particularly well suited for cutting operations that may benefit from a relatively more aggressive cutting action as compared to flat faced cutters. Although the advantages of this invention may be provided on single body ball nose end mills having the cutter fabricated into the tool body, preferred embodiments are illustrated providing replaceable cutter inserts 10 removably affixed to the tool body 20.

FIG. 1 illustrates a ball nose end mill tool body 20 securing a removable U-shaped cutter insert 10 within a cutter end of the tool body 20, and including a flat key surface 42 on a chuck end of the tool body for rotational engagement with a milling machine. An attachment mechanism, such as bolt 25, may secure the cutter insert within the tool body.

Figure 2:
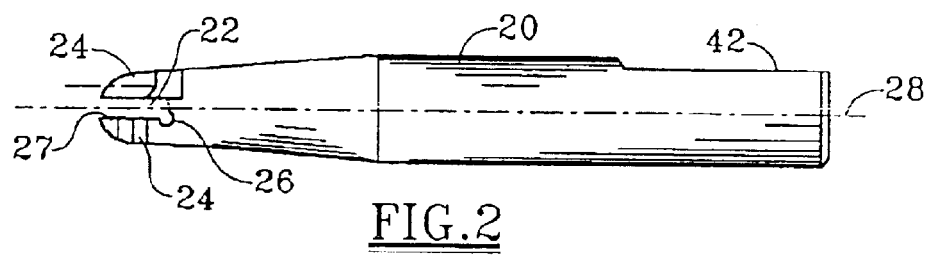
FIG. 2 is an elevation view of the ball nose end mill tool body illustrated in FIG. 1, with the cutter insert removed to depict the insert profile for receiving the cutter insert.

FIG. 2 is an elevational view of the tool body illustrated in FIG. 1 and illustrates the tool body 20 with the cutter insert 10 and attachment mechanism 25 both absent. An insert receiving pocket 22 for positioning the cutter insert therein is illustrated, along with a threaded bore 24 for receiving a countersunk bolt attachment mechanism 25 therein. A relief pocket 26 is provided to permit the relieved side of the receiving pocket 22 to flex and engage the insert when the attachment mechanism 25 is tightened. The tool body 20 may include a centerline of rotation 28, about which the tool body 20 and insert 10 are rotated.

Figure 3:
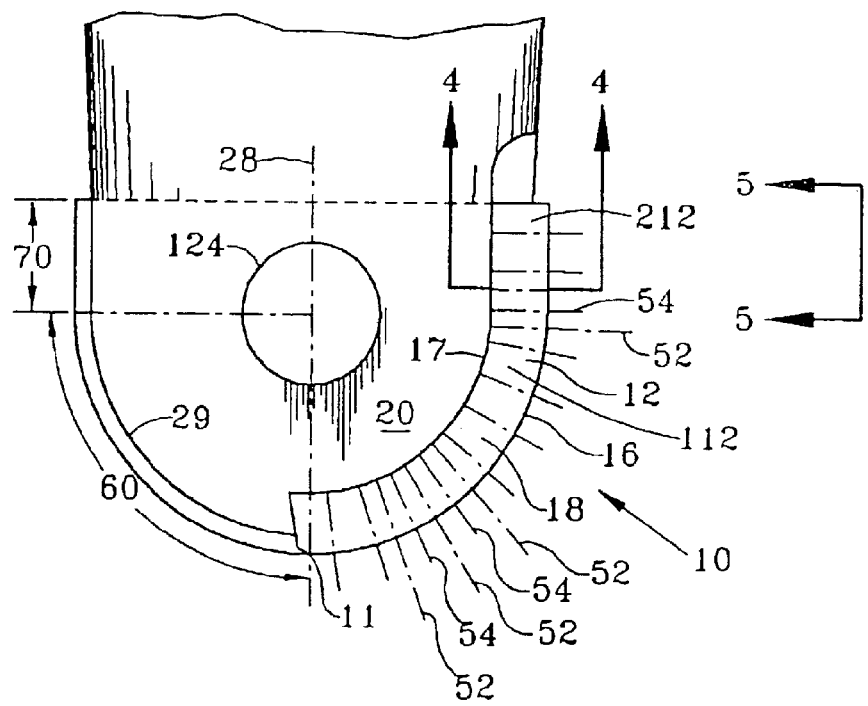
FIG. 3 is a top view of a cutter insert positioned within a cutter end of a tool body, illustrating a serrated or wavy cutting face on the cutter insert.

FIG. 3 is a top view of a cutter insert 10 positioned within the cutter end of the tool body 20, and illustrating a serrated or wavy cutting face 12 provided on the cutter insert 10. A through bore 124 in the insert is provided for receiving the attachment mechanism 25 therein. The illustrated cutter is a generally U-shaped embodiment, including a cutter tip 11 at an axially leading tip or front end of the cutter 10, and further including a curved cutting face 112 as illustrated by arc 60 extending between the tip 11 and an axially trailing side cutting face surface 212. In the illustrated U-shaped embodiment, the side cutting surface 212 includes two straight portions 70. In addition, a side cutting surface may include a portion of the curved cutting surface 112, radially outward from the centerline of rotation. A side cutting surface may be defined broadly to encompass substantially any cutting surface spaced radially outward from the centerline of rotation 28 and axially trailing the tip 11. For example, cutter insert embodiments including circular or oval cutter shapes do not having the straight portion 70. These inserts nevertheless may include a side cutting face surface at substantially any point around the cutting surface extending outward from the centerline of rotation 28, and trailing the leading tip 11. FIG. 3 illustrates the straight cutting side surfaces 212 on each side of the insert body tangentially intersecting respective curved cutting surfaces 112 at a point on each side of the cutter insert 10, whereby a line through those two points also passes through or close to the axial center of the through bore 124. Such embodiment is provided for illustration purposed only and not as an embodiment limitation.

Referring to FIG. 3, the illustrated cutter embodiment includes a first serrated cutting face surface 12 on a first side of the cutter insert 10, such as illustrated on the right side of centerline 28, and a second serrated cutting face surface on an opposing second side of the cutter insert 10, such as illustrated on the left side of centerline 28. As shown, the first and second cutting face surfaces follow curved paths within respective planes substantially parallel to the centerline of rotation.

Figure 4:
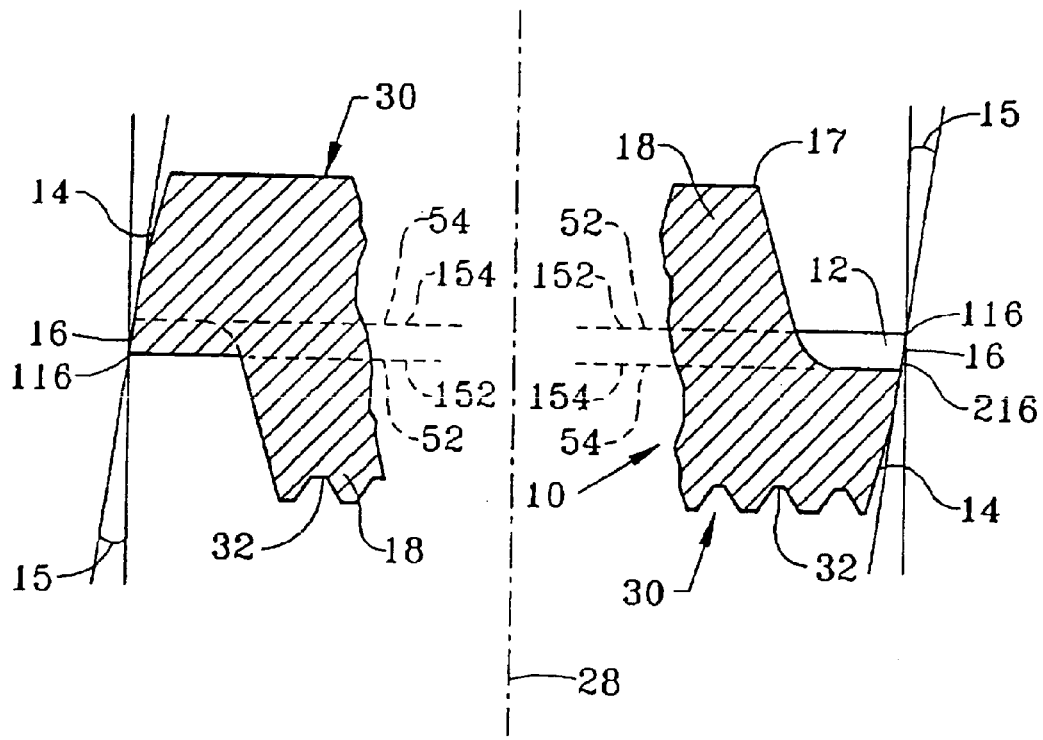
FIG. 4 is a cross-sectional elevation view along lines 2—2 illustrating a portion of the cutter insert illustrated in FIG. 3. Also illustrated is a plurality of grooves for engaging a mating contact surface in the tool body.

FIG. 4 is a cross-sectional elevation diagram of a portion of the cutter insert illustrated in FIG. 3. The cutter insert 10 may include a cutter insert body 18, preferably having opposing planar surfaces 30 for engaging the sides of the insert pocket 22 in the cutter body 20. To strengthen the insert, a radially inward portion of the cutter insert 10 may be relatively thicker than the radially outward portions of the insert that have the serrated cutting face 12 and cutting edge 16. Edge 17 illustrated in FIGS. 3 and 4 depicts a transition at edge 17 from a relatively thicker portion of the insert 10 to a relatively thinner portion that includes the cutting face 12. FIG. 4 further illustrates a plurality of grooves 32 in surface 30 for engaging a mating contact surface 27 in a side of the tool body insert pocket 22.

Figure 5:
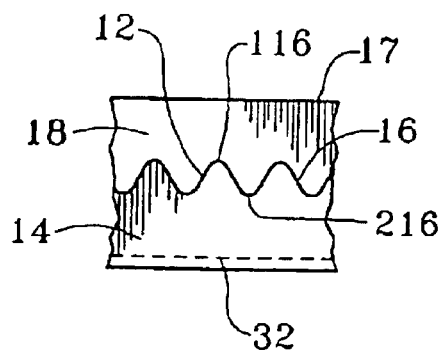
FIG. 5 is an elevation view of a side of the cutter insert illustrated in FIG. 3, further illustrating a sinusoidal shaped, serrated cutting edge along the cutting face.

FIG. 5 illustrates an elevation view of the cutter insert illustrated in FIG. 3, looking toward a side of the insert. This view illustrates the serrated cutting edge and for simplification purposes illustrates a straight segment of serrations having a cutter edge which may lie within a plane that is substantially parallel with the centerline of rotation 28. The cutter also includes a curved portion, such as illustrated in FIG. 3. In addition to illustrating a sinusoidal or wave shaped serrated cutting edge, FIG. 5 illustrates a land surface 14 between the cutting edge 16 and a peripheral edge of the back 30 of the insert. The cutting edge 16 is formed substantially along the curvy line of intersection where the cutting face surface 12 intersects land surface 14. The land surface 14 may be positioned at an angle, illustrated in FIG. 4 as angle 15, which is slightly less than a right angle with respect to a crest plane positioned on the plurality of crests 116 on the face surface 12. This angle 15 may be referred to as the relief angle, and may prevent the heel or land surface 14 from engaging the work piece as the insert is rotated about the centerline of rotation. Cutting edge relief angles 15 may commonly be from 3 to 6 degrees for hard or tough materials, 4 to 7 degrees for medium hard materials, and 6 to 12 degrees for relatively soft materials which are relatively easy to mill.

Referring again to FIG. 4, each of the plurality of serration peaks 116 may include a crest axis 52, while each of the plurality of serration roots 216 may include a root axis 54. Each of the face crest centerlines 52 and the face root centerlines 54 are preferably generally perpendicular to a respective intersection of the respective centerline 52 or 54 and a tangent to the curved cutting edge. Each of the crest axes 52 may be commonly positioned within a crest plane 152, while each of the root axes may be commonly positioned within a root plane 154. The crest plane 152 preferably may be parallel to the root plane 154, or alternatively positioned at a slight angle with respect to root plane 154.

The crest plane 152 or the crest axis 52 may pass through the centerline of rotation 28. Such configuration may be described as a the crest axis portion of the cutter face 12 having a "neutral rake." Rake angle may be defined as the angle in degrees that a plane along the cutter face, including the cutting edge 16, deviates from a radial line from the centerline of rotation to the cutting edge 16. The axis 52 along the cutter face 12 may be angled with respect to the axial centerline of rotation 28, thereby having an axial rake. A plane along the cutter face angled with respect to the radial line from the centerline of rotation to the cutter edge 16 may provide a radial rake. Each of radial and axial rake angles on the insert 10 may be positive, neutral, or negative.

Each of the plurality of crest axes 52 may be non-parallel with the adjacent root axes 54 such that both axes 52 and 54 intersect the centerline of rotation 28. In such configuration, the cutting surface 12 may have a neutral rake substantially along the full length of the cutting edge 16. When crest axis 52 is positioned such that it passes behind the centerline of rotation 28, with respect to the direction of cutting edge rotation, the cutting surface 12 may be defined as having a positive rake. Conversely, when the crest axis 52 is positioned such that the respective crest axis 52 passes in front of the centerline of rotation 28, with respect to the direction of cutting edge rotation, the cutting surface 12 may be defined as having a negative rake.

Rake angle selection may vary according to the hardness or material composition of the work piece. Higher positive rake angles, such as 6 to 12 degrees, may be preferred for high-speed steel cutter inserts and for cutting relatively soft work piece materials. Lower positive angle, neutral angle, and negative angle rakes may be preferred for carbide cutter inserts or for harder, tougher or more abrasive work piece materials, where vibration or impact resistance are of concern, or when it is otherwise desirable to provide additional material behind the cutting edge 16 for increased shock load resistance.

Each of the sinusoidal peaks may provide a radial and/or axial leading cutter edge 116, while the sinusoidal roots provides a trailing cutter edge 216. The plurality of cutting edges between the crests and roots each may include a corresponding plurality of rake angles. Because of the relief angle 15, as the cutting edge 16 oscillates between crests and roots along the length of the cutting edge, the radial distance from a respective segment of the cutting edge to the centerline of rotation may vary with respect to the radial distance from an adjacent segment of the cutting edge. In addition, radial and axial rake angles also may vary as the orientation of the cutting edge changes along the length of the cutting edge. The plurality of angles and radial positions along the length of the cutting edge translates into improved shear of the work piece along the cutting edge.

In one embodiment, the crest centerlines 52 may be angled to provide a positive rake, while the root centerlines may provide neutral rake. In still other configurations, the crests may have a positive rake while the roots have neutral or positive rake. The crests of either such embodiment may resemble a pup tent propped at one end with the tent pole removed from the opposing end.

In addition, FIG. 5 illustrates an elevation view of a reduction in insert thickness toward the radially outward periphery of the insert 10 as compared to radially inward portions of the insert. The thickness reduction is also illustrated in FIG. 4, occurring between edge 17 and a radially inward portion of the cutter face 12.

One embodiment of a ball nose end mill insert 10 for removable affixation to a tool body 20 may include an insert body 18 having a contact surface 30 for mating engagement with a mounting surface 27 of the tool body. The insert body contact surface 30 may include a plurality of grooves 32 for mating engagement with corresponding grooves on the mounting surface 27 of the tool body. The insert body 18 may include a curved cutting face surface 12 extending between an axially leading tip cutting face surface 11 and an axially trailing side cutting face surface 112 or 212, substantially spaced apart from the centerline of rotation 28. The insert body 18 may include a curved land surface 14 adjacent the curved cutting face surface, such that intersection of the curved cutting face surface 12 and the curved land surface 14 forms a curved cutting edge 16. A plurality of face serrations may be formed along the curved cutting face surface 12, the face serrations having face crests 116 each raised from the contact surface 30 a distance greater than a spacing between an adjacent face root 216 and the contact surface 30. Each face crest 116 may have a face crest centerline 52 and each face root 216 may have a face root centerline 54, and the plurality of face serrations may form a serrated curved cutting edge 16. The serrated curved cutting edge 16 may be curved in that the cutting edge 16 extends axially along the centerline of rotation 28 from a cutting tip 11, axially rearward toward the chuck-end of the tool body. The face crests 116 and the face roots 216 each lie substantially within a respective crest plane 152 and root plane 154.

Each of the crest plane 152 and the root plane 154 may be substantially parallel to the centerline of rotation. As discussed above, depending upon the rake angle, each crest plane 152 and root plane 154 may or may not intersect the centerline of rotation 28. As illustrated in FIGS. 3 and 5, the curved face surface may also include a first cutting face surface, such as surface 12, lying within a first plane and positioned on one side of the centerline of rotation 28 of the tool body, and a second cutting face surface, such as surface 112, may lie within a second plane substantially parallel to the first plane and on an opposed side of the centerline of rotation 28 of the tool body. For example, in observing a non-rotating insert body, the first cutting face surface may be positioned to the right of the centerline of rotation, while the second cutting face surface may be positioned to the left of the centerline of rotation and on an opposed side of the cutter insert. A cutting face surface 12 may also include the substantially sinusoidal surface between and including the plurality of crest peaks and the plurality of crest roots.

The plurality of face serrations may have substantially identical, substantially sinusoidal-shaped crest and root profiles along each cutting face, in that the sinusoidal profiles are substantially repeating along the cutting face. A sinusoidal crest and root profile is not limited to serration profiles having only curved surfaces. Each of the plurality of face serrations may include a curved portion, such as a crest profile, flanked on each side with a straight portion that connects or adjoins with an adjacent or subsequent curved portion, such as root profiles. Some embodiments may also include crest and root profiles including all curved portions, without interconnecting straight portions between the crests and roots. Still other embodiments may include very small curves on the crests and roots, connected by straight portions between the crests and roots, thereby providing a more jagged cutting edge. Other generally wavy or jagged patterns may thus be provided on the cutting face surface, although a generally sinusoidal shaped pattern is preferred.

As illustrated in FIG. 3, insert embodiments may include a side cutting edge 16 formed by the side cutting face surface 212 and a side land surface 14. The side cutting edge 16 may be a straight portion, such as illustrated by insert segment 70, which is parallel to the centerline of rotation 20, and includes another plurality of serrations formed along the side cutting face surface 212 forming the serrated side cutting edge.

In one embodiment, each of the plurality of face crests on a first cutting face on a first side of the centerline of rotation is positioned at a respective axial position along the centerline of rotation. A corresponding face root is positioned at each respective axial position along the centerline of rotation on a second cutting face on a second side of the centerline of rotation. Thereby as a cutter rotates without axial movement along the centerline of rotation, where a first side of the cutter engages a plurality of portions of the object material with a plurality of respective roots, the second side of the cutter may engage the same respective plurality of portions of material with a respective plurality of crests, as the cutter rotates. Thereby, a relatively smoother cut may be made in the object material than may be performed with a cutter in which the plurality of crests on one side of the cutter are axially aligned with a corresponding plurality of crests from the opposing side.

An additional advantage of this invention is that the cutter inserts may be shaped in a variety of configurations embodying the serrated cutting edge. The cutter inserts may be generally U-shaped, as illustrated in FIG. 3, or the inserts may be shaped substantially circular, oval, rectangular, including a flat bottom portion. Still other embodiments may be dove-tail shaped or exhibit tapered sides. Regardless of configuration, a ball nose end mill has a curved surface that extends between an axially leading tip cutting fact and an axially trailing side cutting surface, substantially spaced from the centerline of rotation.

The cutter insert of this invention will be commonly used in a first phase of machining a part to remove a major mass of material at a relatively fast rate with less stress on the tool and the machine. Thereafter, a finishing tool with a straight cutting edge may be used in the second phase of machining to cut the finished surface.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A ball nose end mill insert for removable affixation to a tool body having a centerline of rotation, the insert comprising:

an insert body having a contact surface for mating engagement with a mounting surface of the tool body;

the insert body including a curved cuffing face surface following a curved path within a plane substantially parallel to the centerline of rotation and extending between an axially leading tip cuffing face surface and an axially trailing side cutting face surface substantially spaced from the centerline of rotation, the insert body including a curved land surface extending between a tip land surface and a side land surface substantially perpendicular to the tip land surface;

a plurality of face serrations formed along the curved cutting face surface, the face serrations having face crests each raised from the contact surface a distance greater than a spacing between an adjacent face root and the contact surface, each face crest having a face crest centerline and each face root having a face root centerline, an intersection of the curved land surface and the plurality of face serrations along the curved cutting face surface forming a serrated curved cutting edge; and each face crest at the curved cutting edge being spaced farther from the centerline of rotation than the adjacent face root, such that the face crest engages a workpiece to minimize engagement of the face roots with the workpiece.

2. A ball nose end mill insert as defined in claim 1, wherein the face crests and the face roots each lie substantially within a respective crest plane and root plane.

3. A ball nose end mill as defined in claim 2, wherein each of the crest plane and the root plane are substantially parallel to the centerline of rotation.

4. A ball nose end mill insert as defined in claim 1, wherein the curved cutting face surface comprises:
   a first cutting face surface lying within a first plane and positioned on one side of the centerline of rotation of the tool body and a second cutting face surface lying within a second plane substantially parallel to the first plane and positioned on an opposed side of the centerline of rotation of the tool body.

5. A ball nose end mill insert as defined in claim 1, wherein the plurality of face serrations have substantially identical sinusoidal-shaped crest and root profiles.

6. A ball nose end mill insert as defined in claim 1, further comprising:
   a side cutting edge formed by the side cutting face surface and the side land surface, the side cutting edge being parallel to the centerline of rotation, and including another plurality of serrations formed along the side cutting face surface having face crests and face roots forming a serrated side cutting edge with the side land surface, each face crest at the side cutting edge being spaced farther from the centerline of rotation than the adjacent face root.

7. A ball nose end mill insert as defined in claim 1, wherein each of the crest centerlines and the root centerlines are generally perpendicular to a respective intersection of the respective centerline and a tangent to the curved cutting edge.

8. A ball nose end mill insert as defined in claim 1, wherein the insert body is formed from a carbide material.

9. A ball nose end mill insert as defined in claim 1, further comprising:
   a mounting opening extending through the insert body for receiving an attachment mechanism for securing the insert body to the mounting surface of the tool body.

10. A ball nose end mill insert as defined in claim 1, where in the insert body contact surface includes a plurality of grooves for mating engagement with corresponding grooves on the mounting surface of the tool body.

11. A ball nose end mill insert as defined in claim 1, wherein each of the plurality of face crests on a first cutting face on a first side of the centerline of rotation is positioned at a respective axial position along the centerline of rotation, and a corresponding face root is positioned at each respective axial position along the centerline of rotation on a second cutting face on a second side of the centerline of rotation.

12. A ball nose end mill having one or more removable cutter inserts, comprising:
   an axially extending tool body having a centerline of rotation;
   a tool mounting surface on the tool body for removably securing an insert body to the tool body;
   the insert body having a contact surface for mating engagement with a mounting surface of the tool body, the insert body including a curved cutting face surface following a curved path within a plane substantially parallel to the centerline of rotation and extending between an axially leading tip cutting face surface and an axially trailing side cutting face surface substantially spaced from the centerline of rotation, the insert body including a curved land surface extending between a tip land surface and a side land surface substantially perpendicular to the tip land, surface;
   a plurality of face serrations formed along the curved cutting face surface, the face serrations having face crests each raised from the contact surface a distance greater than a spacing between an adjacent face root and the contact surface, each face crest having a face crest centerline and each face root having a face root centerline, an intersection of the curved land surface and the plurality of face serrations along the curved cutting face surface forming a serrated curved cutting edge; and
   each face crest at the curved cutting edge being spaced farther from a center of rotation than the adjacent face root, such that the face crest engages a workpiece to minimize engagement of the face roots with the workpiece.

13. A ball nose end mill insert as defined in claim 12, wherein the face crests and the face roots each lie substantially within a respective crest plane and root plane.

14. A ball nose end mill as defined in claim 13, wherein each of the crest plane and the root plane are substantially parallel to the centerline of rotation.

15. A ball nose end mill as defined in claim 12, wherein the curved face surface comprises:
   a first cutting face surface lying within a first plane and positioned on one side of the centerline of rotation of the tool body and a second cutting face surface lying within a second plane substantially parallel to the first plane and positioned on an opposed side of the centerline of rotation of the tool body, the another plurality of serrations along the side land surface including face crests each spaced farther from the centerline of rotation than an adjacent face root.

16. A ball nose end mill as defined in claim 12, wherein the plurality of face serrations have substantially identical sinusoidal-shaped crest and root profiles.

17. A ball nose end mill as defined in claim 12, further comprising:
   a mounting opening extending through the insert body for receiving an attachment mechanism for securing the insert body to the mounting surface of the tool body.

18. A ball nose end mill as defined in claim 12, where in the insert body contact surface includes a plurality of grooves for mating engagement with corresponding grooves on the mounting surface of the tool body.

19. A ball nose end mill insert for removable affixation to a tool body having a centerline of rotation, the insert comprising:
   an insert body having a contact surface for mating engagement with a mounting surface of the tool body;
   the insert body including a curved cutting face surface following a curved path within a plane substantially parallel to the centerline of rotation and extending between an axially leading tip cutting face surface and an axially trailing side cutting face surface substantially spaced from the centerline of rotation, the insert body including a curved land surface adjacent the curved cutting face surface and extending between a tip land surface and a side land surface substantially perpendicular to the tip land surface;
   a plurality of face serrations formed along the curved cutting face surface, the face serrations having face crests each raised from the contact surface a distance greater than a spacing between an adjacent face root and the contact surface, each face crest having a face crest centerline and each face root having a face root centerline, an intersection of the curved land surface and the plurality of face serrations along the curved cutting face surface forming a serrated curved cutting edge, and the face crests and the face roots each lie substantially within a respective crest plane and root plane;

each face crest at the curved cutting edge being spaced farther from the centerline of rotation than the adjacent face root, such that the face crest engages a workpiece to minimize engagement of the face roots with the workpiece; and a side cutting edge formed by the side cutting face surface and the side land surface, the side cutting edge being parallel to the centerline of rotation, and including another plurality of serrations formed along the side cutting face surface having face crests and face roots forming a serrated side cutting edge with the side land surface, each face crest at the side cutting edge being spaced farther from the centerline of rotation than the adjacent face root.

20. A ball nose end mill as defined in claim 19, wherein each of the crest plane and the root plane are substantially parallel to the centerline of rotation.

21. A ball nose end mill as defined in claim 19, wherein the curved face surface comprises:

a first cutting face surface lying within a first plane and positioned on one side of the centerline of rotation of the tool body and a second cutting face surface lying within a second plane substantially parallel to the first plane and positioned on an opposed side of the centerline of rotation of the tool body.

22. A ball nose end mill as defined in claim 19, wherein the plurality of face serrations have substantially identical sinusoidal-shaped crest and root profiles.

* * * * *